United States Patent [19]

Lesieur

[11] 4,367,496

[45] Jan. 4, 1983

[54] METHOD AND ARRANGEMENT FOR MAGNETIC DIGITAL RECORDING WITH HIGH FREQUENCY BIASING

[75] Inventor: Jean-Paul Lesieur, Massy, France

[73] Assignee: Compagnie Internationale pour l'Informatique CII-Honeywell Bull (Societe Anonyme), Paris, France

[21] Appl. No.: 156,368

[22] Filed: Jun. 4, 1980

[30] Foreign Application Priority Data

Jun. 18, 1979 [FR] France .............................. 79 15584

[51] Int. Cl.$^3$ .............................................. G11B 5/09
[52] U.S. Cl. ...................................... 360/45; 360/42; 360/43; 360/51
[58] Field of Search ...................... 360/40, 42, 43, 45, 360/51; 375/56

[56] References Cited

U.S. PATENT DOCUMENTS

| | | | |
|---|---|---|---|
| 3,215,779 | 11/1965 | Halm et al. ............................ | 375/56 |
| 3,551,816 | 12/1979 | Paine ..................................... | 375/56 |
| 3,641,524 | 2/1972 | Norris ................................... | 360/40 |
| 3,952,329 | 4/1976 | Dent et al. ............................ | 360/40 |
| 3,980,824 | 9/1976 | Lamb et al. ........................... | 178/67 |
| 4,017,903 | 5/1977 | Chu ....................................... | 360/40 |

FOREIGN PATENT DOCUMENTS 1333951 10/1973 United Kingdom .

OTHER PUBLICATIONS

"High Density Recording with Write Current Shaping" by Geo. Jacoby, IEEE Transactions on Magnetics, vol. 15, #3, Jul. 1976.
"DC-Balancing Resynchronization Symbols"—Cage et al., IBM T. D. B., vol. 18, #6, Nov. 1975, pp. 1724-1725.

Primary Examiner—Vincent P. Canney
Attorney, Agent, or Firm—Kerkam, Stowell, Kondracki & Clarke

[57] ABSTRACT

The invention relates to a method and circuit arrangement for magnetic recording of a digital data signal composed of a set of transitions. A recording signal is formed by superposition on the data signal of a high frequency, constant amplitude, magnetic biasing signal $S_p$. The biasing signal is phase-modulated relative to the data signal transitions. The invention remedies "peak shift" and can be applied to any rectangular or sinusoidal biasing signal.

4 Claims, 28 Drawing Figures

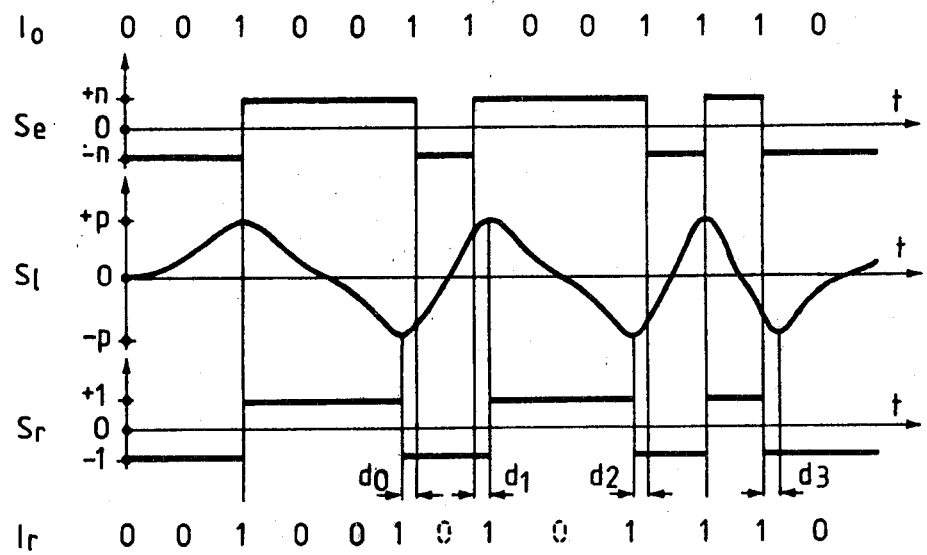
FIG.1 (PRIOR ART)
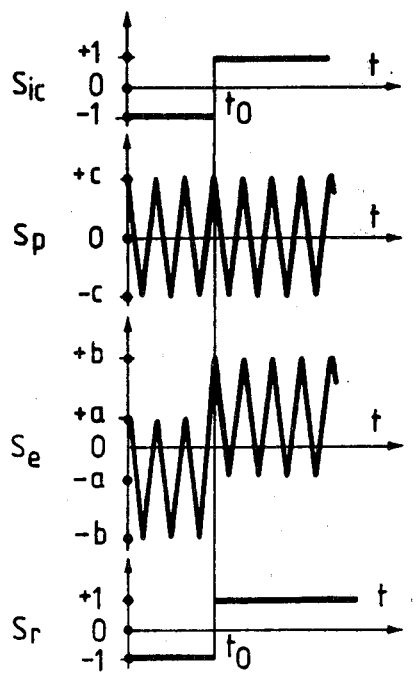
FIG. 2A
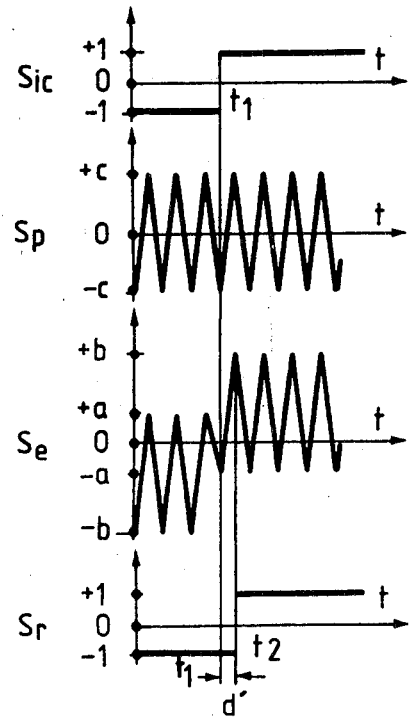
FIG. 2B
FIG. 2 (PRIOR ART)

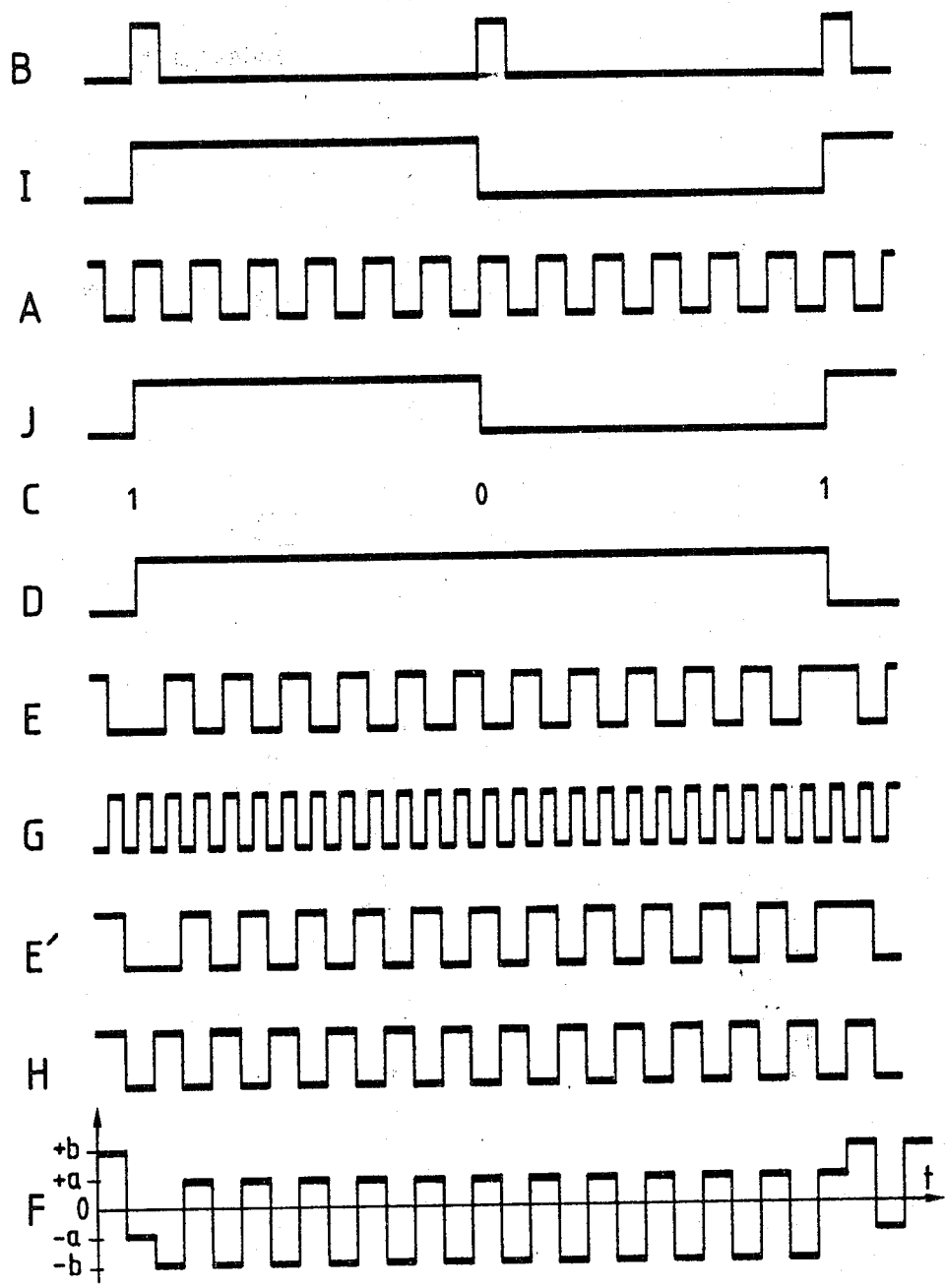

METHOD AND ARRANGEMENT FOR MAGNETIC DIGITAL RECORDING WITH HIGH FREQUENCY BIASING

BACKGROUND OF THE INVENTION

1. Field of the Invention

The invention relates to a method and an arrangement for magnetic digital recording with high frequency biasing.

2. Description of the Prior Art

The magnetic recording of a data signal consists basically in creating a write current in a magnetic head, which produces on one face of a magnetic support such as a tape, disc or drum a residual magnetisation representative of the initial data.

In the case of an electric analog data signal, for example a signal whose amplitude is representative of sound from an acoustic transducer, it is evident that the residual magnetisation created by the write current should faithfully respect, in time, the amplitude of the data signal. This is universally obtained by superimposing on the data signal a high frequency, constant amplitude, alternating current signal which constitutes a magnetic biasing. Put briefly, the curve of first magnetisation of the magnetic material of the recording carrier starts with a quadratically curving part, extends in a linear part and ends in a part which curves in to end in saturation. Without the magnetic biasing current, the recording of the data signal would correspond to making a more or less large excursion in the curve of the first magnetisation from its origin and at each point of the recording carrier according to the level of amplitude of the write signal. The quadratically increasing part of the curve would always be involved so that the recorded signal would present a high rate of distortion. The superposition on the data signal of a high frequency, constant amplitude, alternating current signal constitutes a magnetic biasing in the sense that the excursions can be made in the linear part of the curve of the first magnetisation. Furthermore, the high frequency magnetic biasing leaves the recording carrier non-magnetised in the absence of the data signal, the more so since the length of the corresponding wave of the biasing current is inferior to the power of resolution of the read head, which power is essentially dependent on the value of the read air gap. On the other hand, although a direct current magnetic biasing is also possible, it would place the recorded carrier, in the absence of the data signal, in a permanently magnetised state which would have repercussions in the read signal in a great background noise.

A binary coded digital data signal indicates successively, at a given recurrence frequency, the value 0 or 1 of a data bit. This signal comprises, therefore, two correlative components—a repeated series of instants and a series of corresponding binary values—which the residual magnetisation should normally translate faithfully. To do this, it has been attempted to represent at least one of the two binary values by a magnetic flux transmission determined as a function of a selected code occurring at a precise corresponding instant.

In current practice, magnetic transitions are advantageously inversions of biasing of the residual field, designed to make this field change between two predetermined positive and negative biasing levels of the magnetic material of the recording carrier. The result of this is to create in this carrier a set of magnets placed end-to-end, with adjacent poles of the same kind, and of length corresponding to the time interval separating two transitions conforming to the method of coding chosen. By convention, a reversal of the residual field from a negative level to a positive level of biasing will be called a positive transition, a reversal in the opposite direction being a negative transition.

Among the types of coding most used is that called NRZ1 (non return to zero for bits of value "1"). In the NRZ1 code, only bits with a value of 1 are represented by magnetic transitions independently of the direction of these transitions. In another popular code called "coded phase," wherein the two binary values correspond respectively to the positive and negative transitions. As will be seen later, the method of coding chosen does not matter for the purpose of the present invention.

Various problems are, in effect, related to the accuracy of recording and reading of the other component of the digital data signal relative to the instants at which the transitions should have taken place.

It has been noted previously that the binary data is translated on the recording carrier as a series of magnets placed end-to-end, of which the adjacent poles are of the same kind and translate the existence of a transition. The read current produced by the read head during passage of two adjacent semi-magnets is, therefore, in the form of a clock curve, of which the peak corresponds to the transition, since the variation in magnetic flux in the read winding is greatest during passage of the two neighbouring poles of the two magnets before the air gap of the read head. However, when two transitions are very close together (which is the case with high recording densities), the successive curves run into each other or combine so that the current peaks are offset from the actual transitions. This phenomenon, more generally known as peak shift, increase with the frequency of transitions so that, for high recording densities, the peaks can be shifted by up to about one third of the smallest space which can separate two transitions. The decoding circuits must therefore be very active, the more so since to this shifting variations in the speed of travel of the recording carrier are added. Various attempts have therefore been made with a view to reducing the size of the peak shift.

Results have been obtained in this direction by using a digital recording signal similar to an analogue recording signal. Experience has in fact shown a reduction in peak shift for high write densities, above around 200 inversions of flux per millimeter, with a composite recording signal formed by the superposition of a high frequency, constant amplitude, magnetic biasing alternating signal on the digital coded data signal.

In this composite recording signal, each transition is represented by a difference in peak amplitudes of the same sign as two neighbouring half-waves of the biasing signal which are present respectively before and after the instant of transition corresponding to the data signal. Thus, the high frequency biasing is of interest from the moment when these two alternations are separated by a fixed time interval, theoretically corresponding to the period of the biasing signal and resulting in a suppression of the peak shift. However, in alternating biasing, digital recording devices of the prior art, this time interval can deviate unequally and erratically from the value of this period and can cause uncertainties and errors in decoding the signal registered by these devices. These deviations result from the distribution of transitions in the coded digital data signal, the latter being therefore able to arise at any instant in a period of the magnetic biasing signal and act so that the superposition of the two signals is more or less favorable. The more favorable situation (zero deviation) occurs when there is a coincidence between a transition of a given sign and the peak amplitude of the same sign of the high frequency biasing signal. On the other hand, the deviation is maximum when the transition of a given sign occurs at the moment when the biasing signal reaches a peak amplitude of the opposite sign, in which case the following peak amplitude is delayed by about half a wave-length of the biasing signal.

It follows that the size of the peak shift depends on the phase of the magnetic biasing signal with respect to the coded signal and that, if the peak shift is on average effectively reduced by the alternating biasing, relatively high values can be obtained for certain transitions and very active circuits will be needed for the reading and decoding of signals recorded in this manner.

To avoid this peak shift, it would appear of interest to render the biasing signal synchronous, as regards frequency, with the clock for controlling the coded digital signal to be recorded. However, because the positive and negative transitions in the coded signal are distributed in a random manner, the phase that exists between each transition and the magnetic biasing signal remains uncertain, so that more or less favorable cases will still occur, as in the preceding case.

It should be apparent, on the other hand, that the increase in the frequency of the biasing signal with respect to the higher frequency of recurrence of transitions diminishes the peak shift effect. Also, the increase in the frequency of the biasing signal is in practice quickly limited by the fact that it raises the electromagnetic losses in the materials forming the recording heads as a result. Furthermore, an attenuation of the peak shift is observed when there is a judicious relationship between the frequency of the magnetic biasing signal and the clock frequency according to the rhythm at which the coding is effected. Nevertheless, there remain unfavorable cases which could still cause alteration of the restored message in certain cases and, as a result, necessitate the presence of a sufficiently improved read and decoding device to remove these risks.

SUMMARY OF THE INVENTION

The invention remedies the existence of any unfavorable case for a digital magnetic recording with high frequency biasing.

To this end, the invention relates to a method of magnetic recording of a digital data signal composed of a series of transitions, of the type consisting in superimposing a high frequency, constant amplitude, magnetic biasing signal on the data signal, and is characterized in that the phase of the biasing signal is modulated on the data signal transitions.

In addition, the invention relates to an arrangement for magnetically recording a digital data signal composed of a series of transitions comprising magnetic biasing means for delivering an original high frequency, constant amplitude, biasing signal, and means for combining the data signal with the magnetic biasing signal so as to provide a recording signal, and characterized by means for modulation of the phase of the original biasing signal relative to the data signal transitions.

BRIEF DESCRIPTION OF THE DRAWINGS

The characteristics and advantages of the invention will be seen more clearly from the text which follows, with reference to the accompanying drawings, in which:

FIG. 1 illustrates an example of magnetic recording in NZR1 code of the prior art technique, not using alternating magnetic biasing;

FIG. 2 comprising parts 2A and 2B illustrate, respectively, the most favorable and least favorable cases of digital recording with alternating biasing according to the prior art;

FIG. 11 comprising parts A-J and E' illustrate, by way of example, waveforms and data which can be obtained at various points of the recording device shown in FIG. 10.

DESCRIPTION OF THE PREFERRED EMBODIMENTS

Figure 3:
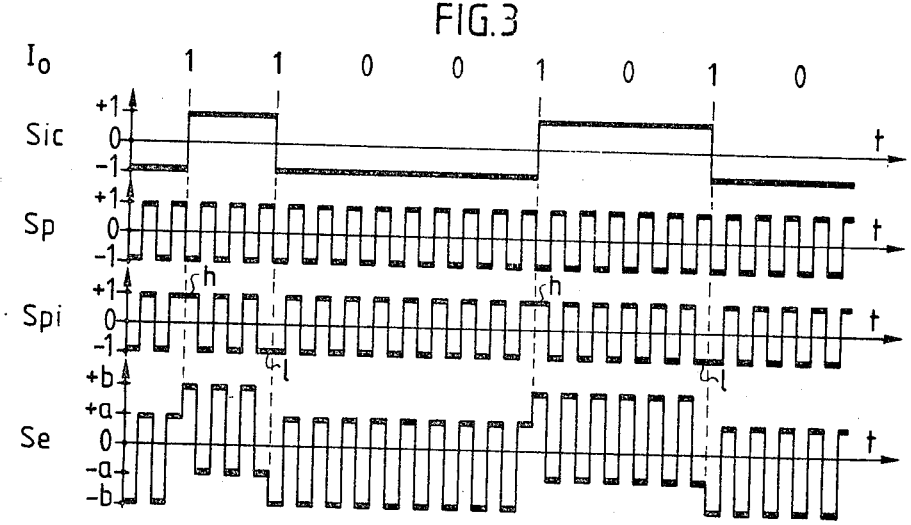
FIG. 3 illustrates an example of digital magnetic recording in NZR1 code with alternating biasing according to the invention.

The invention will be better brought out following a short description of the results obtained by previous digital magnetic recording devices, with reference to FIGS. 1, 2A and 2B.

FIG. 1 relates to a digital magnetic recording of the NRZ1 type with no biasing. In this Figure, $I_o$ designates the original binary data to be recorded, formed by a recurrent set of bits such as are indicated by way of example. $S_c$ designates the recording signal, also called the write signal, resulting from the coding of the original data $I_o$ in NRZ1. $S_1$ designates the corresponding read signal obtained across the terminals of the winding of the read head on passage of the data carrier carrying the recording of the write signal $S_c$. $S_r$ designates the signal reproduced from the read signal $S_1$ with a view to obtaining a representation of the digital signal read in the NRZ1 code, and $I_r$ designates the information reproduced after decoding signal $S_r$.

Thus the recording signal $S_e$ is an alternating signal of which the transitions correspond to the bits of value 1 and of which the positive amplitude $+n$ and the negative amplitude $-n$ ordinarily correspond to the positive and negative saturation levels of the magnetic recording material. A read signal, obtained from the terminals of the winding of a read head, has the shape of a positive or negative humped curve according to whether the transition itself is positive or negative and the summit (or peak) of which represents the moment of transition. The occurrence of the peak should correspond to the recording of a transition which is present and isolated on a data carrier. However, because of the variable proximity of the transitions on the one hand and of the high density of recording sought for on the other hand, the hump-shaped characteristics produced at each transition combine together more or less according to their proximity and, as a result, have peaks +p and −p more or less offset from the representative instants of the transitions. Various peak shift values d0, d1, d2 and d3 are indicated by way of example in FIG. 1. Given that the peaks determine the instants of appearance of the transitions and that they are variably offset from these transitions, the signal $S_r$ reproduced by the peaks of the read signal $S_1$ is different from the recording signal $S_e$ although, ideally, the signals $S_e$ and $S_r$ should be identical. Because of the peak shifts d0 to d3, the decoding of the reproduced signal $S_r$ results in an unfaithful reproduction which can produce an item of data $I_r$ which is different from the original item of data $I_o$. In the example shown, the numbers in broken lines illustrate the errors which can be made in the reproduced signals $I_r$ due to decoding of the signal $S_r$.

FIGS. 2A and 2B relate to a digital recording using the magnetic biasing according to prior art. In these figures; $S_{ic}$ designates a coded data signal produced from an original item of data (now shown) according to any code and alternating between two predetermined levels, reference +1 and −1. $S_p$ designates an alternating, magnetic bias signal at high frequency and having constant amplitude c±. $S_e$ designates the recording signal resulting from the superimposition of the preceding signals $S_{ic}$ and $S_p$, and $S_r$ designates the signal repreoduced after recording and reading of the signal $S_e$. From FIG. 2A, the moment $t_o$ of appearance of a positive transition of the data signal $S_{ic}$ correponds to the most favorable recording situation, while in FIG. 2B, the moment $t_1$ corresponds to the least favorable situation.

In these figures the recording signal $S_e$, which excites the winding of the write head, is an oscillating alternating current on both sides of a transition, between values +a to −b and −a to +b. Intensities of ±a relate to weak currents and intensities of ±b represent strong currents across the winding. The positive and negative transitions are respectively represented by jumps between the levels +a to +b and −a to −b. Detection of the peak of the first half-wave which marks such a jump, is interpreted after reading the recorded signal $S_e$, as the moment of transition as illustrated by the signals $S_r$ reproduced in FIGS. 2A and 2B. Under these conditions, on the one hand the linearity of the alternating signal $S_e$ means little (contrary to the analogue recording) so that the ±b levels correspond in practice to the saturation levels of the magnetic material of the recording carrier and so that the relationship between the reference level 1 of the data signal $S_{ic}$ and the level c of the biasing signal $S_p$ is relatively large (generally of the order of ¼) compared with that generally used (1/10) in analogue recording. On the other hand, it is desirable that the peak of the first positive or negative half-wave marking the transition in recording signal $S_e$ coincides respectively with the corresponding positive or negative transition of the data signal $S_{ic}$ so as thus to avoid any shifting of transitions in the signal $S_r$ reproduced. However, due to the fact that the transitions of the data signal $S_{ic}$ are distributed randomly in time, more or less favorable combinations with the alternating biasing signal $S_p$ will be produced. The most favorable situation is shown in FIG. 2A, from which it is seen that the positive transition at the moment $t_o$ of data signal $S_{ic}$ coincides with a positive peak of the biasing signal $S_p$ and that thus the superposition keeps this half-wave unchanged in time in order to designate the transition. The same applies for a negative transition of the data signal $S_{ic}$ and a negative peak of the biasing signal $S_p$. The least favorable situation is described in FIG. 2B, in which the positive transition at the moment $t_1$ of data signal $S_{ic}$ coincides with a negative peak of the biasing signal $S_p$ and the superposition introduces a delay d′ in the appearance of the first half-wave transition in the recording signal. This delay is equivalent to a half-period of the biasing signal $S_p$. The same would be the case for a negative transition conjoint with a positive peak. The peak shift d′ therefore relates the transition to a moment $t_2$ which, with high recording densities, could cause alteration of the contents of the original item of data.

By comparison with FIGS. 2A and 2B, FIG. 3 shows the advantages of a digital recording with biasing according to the invention. In FIG. 3, $I_o$ designates an original binary item of data. $S_{ic}$ designates the corresponding data signal coded in NRZ1. $S_p$ designates an original biasing signal which is directly used in previous recording devices. $S_{pi}$ designates a biasing signal according to the invention, and $S_e$ designates the recording signal resulting from the combination of signals $S_{ic}$ and $S_{pi}$. It is apparent from the shape of the wave of the biasing signal $S_{pi}$ that, according to the invention, the original biasing signal $S_p$ is phase-modulated on the transitions of the coded data signal $S_{ic}$ in the sense that, from each of these transitions the original biasing signal $S_p$ undergoes a successive phase-shift of 180°. In this way, the biasing signal $S_{pi}$ of the invention comprises extended high levels n and low levels l which, combined with the respective transitions of the data signal S $S_{ic}$ are able to reproduce the high and low levels in the recording signal $S_e$ in conditions which are always favorable without any shifting.

Figure 4:
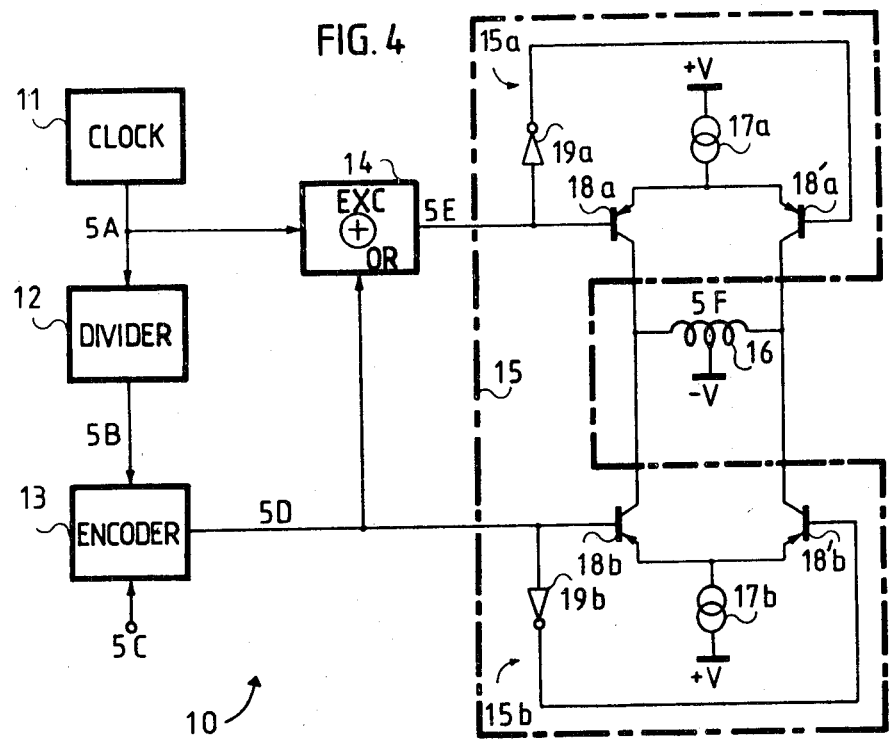
FIG. 4 shows an embodiment according to the invention of a digital recording arrangement with alternating biasing.
Figure 5:
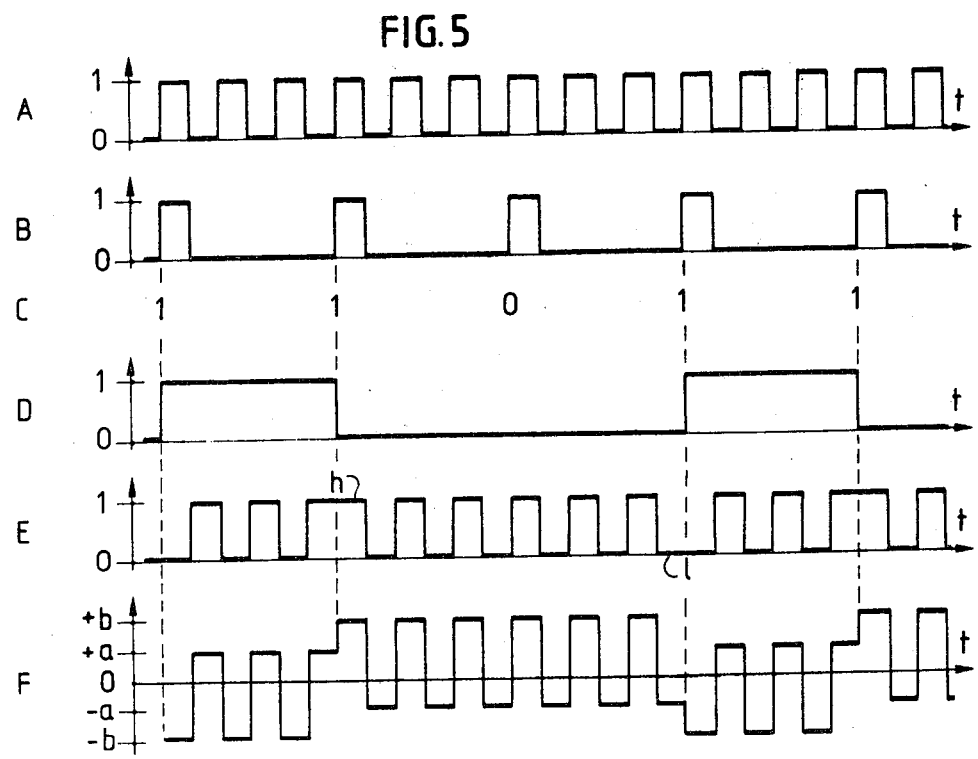
FIG. 5 comprising parts A to F illustrate examples of wave-forms and data which can be obtained at various points of the recording arrangement shown in FIG. 4.

FIG. 4 shows an embodiment of a magnetic digital recording arrangement 10 according to the invention, which will be described with reference to FIG. 5 illustrating, by way of example, waveforms A–F which can be obtained at various points of the circuit arrangement 10.

The digital recording device 10 according to the invention incorporates a clock 11 which delivers a clock signal 5A composed of a series of pulses recurring at a given frequency $f_H$ and at a 0.5 cycle ratio (ratio between the duration of each pulse and their period of recurrence). Signal 5A is applied to an input of a $-N$ frequency divider 12, which produces a signal 5B composed of a series of recurring pulses $f_H/N$ (N being a whole number whose value here is 3). An encoder 13 has a first input receiving the output signal 5B of the frequency divider 12 and a second input receiving an original item of data 5C to be recorded. According to the example shown, encoder 13 extracts from signal 5C the transitions at the rate of the signal 5B and effects a predetermined coding to deliver a coded data signal 5D equivalent to the above-mentioned signals $S_{ic}$. The code chosen by way of example in FIGS. 4 and 5, as in the other figures which follow, is such that the transitions are representative of the bits of value 1 of data 5C so as to obtain a recording signal of the type NRZ1. It will be noted that the signals 5A, 5B and 5D shown and the signal 5E, which will be considered further on, are direct current signals of logic values 0 and 1, although these signals could be alternating like those shown in the preceding figures. Actually, the components introduced into the circuit arrangement 10 for the formation of these signals operate on direct current, a conversion into alternating current of the signals concerned for the formation of the recording signal being made later.

The clock signal 5A and the data signal 5D are applied respectively to two inputs of an exclusive OR gate 14 which delivers a signal 5E at its output. The gate 14 plays the part of a phase modulator modulating, at a predetermined value (180°), the phase of the clock signal 5A (equivalent to the original biasing signal $S_p$ indicated in FIG. 3) on each appearance of the data signal transitions 5D to furnish a modulated biasing signal 5E equivalent to the signal $S_{pi}$ of FIG. 3.

The biasing signal 5E coming from the gate 14 and the coded data signal 5D are fed respectively two inputs of a combining circuit element 15, which furnishes at its output a recording signal 5F intended for the recording winding 16 of the recording head, which is not shown. The combination circuit 15 is formed basically by two current switches 15a, 15b which handle respectively the biasing signal 5E and the data signal 5D. The switches 15a and 15b are respectively formed of two current sources 17a and 17b, which are supplied by a voltage source +V, and of two pairs of transistors 18a, 18a', 18b and 18b', of which the emitters are connected in common to the output of the respective current sources 17a and 17b and the collectors are connected to the end terminals of the recording winding 16. The center point of winding 16 is connected to a predetermined voltage −V.

The biasing signal 5E delivered by the gate 14 is applied directly to the base of the transistor 18a and, by means of an inverter 19a, to the base of the transistor 18'a. In the same way the data signal 5D is applied directly to the base of the transistor 18b and, by means of an inverter 19b, to the base of the transistor 18'b. The switches 15a and 15b thus switch the currents corresponding to signals 5D and 5E, which are thus made alternating. These currents are added together in the winding 16 in the form of signal 5F similar to the recording signal $S_e$ shown in FIG. 3. It will be noted that in FIG. 5, due to the phase displacement by 180° which occurs in the signal 5E on each transition of the data signal 5D, this phase modulation produces transitions from +a to +b and from −a to −b in the resulting signal 5F at instants which always correspond to the data signal transitions.

In the example shown in FIGS. 4 and 5, the clock signal 5A controls the formation of the data signal 5D by means of the frequency divider 12. The magnetic biasing signal 5E is synchronized with the clock signal 5A due to the phase modulator constituted by the gate 14.

Figure 6:
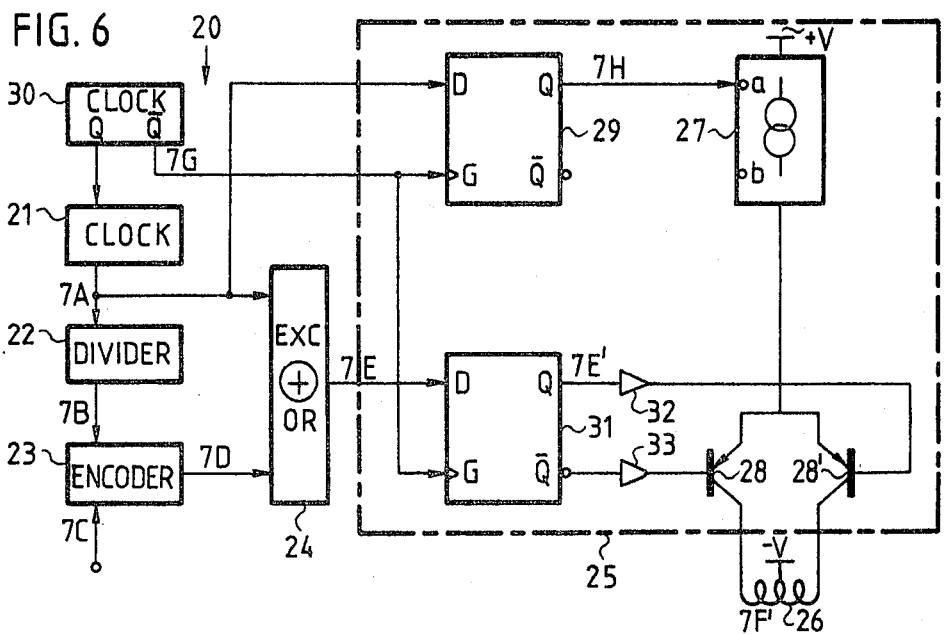
FIG. 6 shows a first embodiment according to the invention of a digital recording arrangement with alternating biasing.
Figure 7:
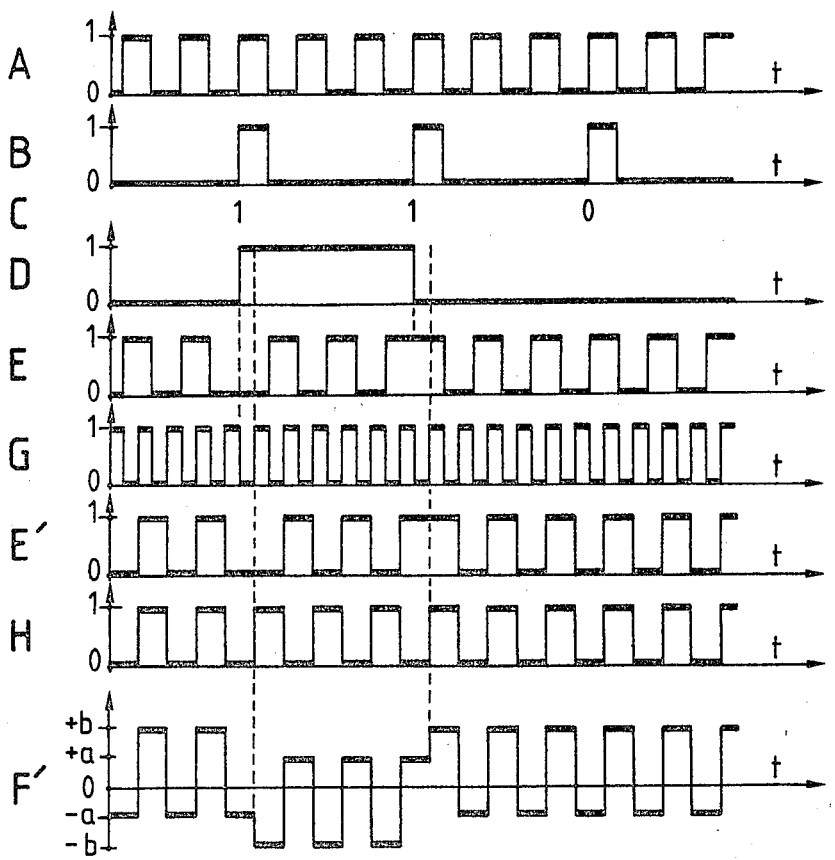
FIG. 7 comprising parts A to G, E', H and F' illustrate examples of wave-forms and data which can be obtained at various points of the recording arrangement shown in FIG. 6.

FIGS. 6 and 7 show a circuit arrangement 20 forming a modification of the embodiment of the digital recording arrangement 10 which has just been described. The similarity between the arrangements 10 and 20 is explained by the fact that the elements 21 to 28, 28' of the arrangement 20 correspond respectively to elements 11 to 18, 18' of the arrangement 10. Furthermore, signals 7A to 7E are similar respectively to signals 5A to 5E, while the signal 7E' represents a version of the signal 7E shifted in time and the signal 7F' represents the signal resulting from signal 7E' and also forms a version of the signal 5F which is shifted in the same time. The signals 7G, 7H are new signals involved in the embodiment shown in FIG. 6.

More precisely in the same way as the recording arrangement 10, the arrangement 20 comprises a clock 21, a frequency divider 22, and encoder 23, an exclusive OR gate 24 and a combining circuit element 25 supplying a recording winding 26 and including a current source 27 which supplies a pair of transistors 28, 28' which are intended for excitation of the winding 26. The clock 21 furnishes a clock signal 7A to a frequency divider 22 and to an input of the gate 24. The divider 22 divides the frequency of the clock signal 7A by a predetermined whole number N (here N=6) to form a signal 7B acting as a clock for coding the original data signal 7C entering the encoder 23. This encoder effects the frequency synchronization of signals 7B and 7C and thus furnishes the other input of gate 24 with a continuous coded data signal 7D. Gate 24 constitutes a phase modulator to form a modulated biasing signal 7E, in which each transition of the data signal 7D successively triggers a phase displacement by 180° of the clock signal 7A.

The embodiment shown in FIG. 6 activates a conventional unit 25 which is used as an element for excitation of the coil 26. The unit 25 is composed of two transistors 28 and 28' and the current source 27 which has two inputs 27a and 27b for the control of strong and weak currents respectively. The example shown relates to control by the input 27a, by which the weak current furnished during normal operation by the source 27 is switched to a strong current of predetermined intensity during a pulse of the signal applied on the terminal 27a. To effect this control from the clock signal 7A, the combination element 25 comprises a D flip-flop 29. A D flip-flop has a data input D (Data), a control input G (Gating), and two outputs, direct Q and complementary Q̄. In a flip-flop of this type, the output follows the input on the order of the control signal applied to the input G. As a result, the flip-flop 29 receives the clock signal 7A on the input D and on its control input G a double frequency signal 7G from the output Q of an astable flip-flop constituting a clock 30. For convenience, the direct ouput Q of the clock 30 feeds a divider by two circuit which forms the clock 21 and which furnishes the square signal 7A (which has a cylic ratio of 0.5).

Under the conditions shown in FIG. 7, the output signal of the D flip-flop 29 takes the shape of the signal 7H. As the signal 7H is shifted by a quarter of a period biasing signal 7E, in which each transistion of the data signal 7D successively triggers a phase displacement of 180° of the clock signal 7A.

The embodiment shown in FIG. 6 activates a conventional unit 25 which is used as an element for excitation of the coil 26. The unit 25 is composed of two transistors 28 and 28' for control of strong and weak currents respectively. The example shown relates to control by the input 27a, by which the weak current furnished during normal operation by the source 27 is switched to a strong current of predetermined intensity during a pulse of the signal applied on the terminal 27a. To effect this control from the clock signal 7A, the combination element 25 comprises a D flip-flop 29. A D flip-flop has a data input D (Data), a control input G (Gating), and two outputs, direct Q and complementary Q. In a flip-flop of this type, the output follows the input on the order of the control signal applied to the input G. As a result, the flip-flop 29 receives the clock signal 7A on the input D and on its control input G a double frequency signal 7G from the output Q of an astable flip-flop constituting a clock 30. For convenience, the direct output Q of the clock 30 feeds a divider by two circuit which forms the clock 21 and which furnishes the square signal 7A (which has a cyclic ratio of 0.5).

Under the conditions shown in FIG. 7, the output signal of the D flip-flop 29 takes the shape of the signal 7H. As the signal 7H is shifted by a quarter of a period from the biasing signal 7E, a D flip-flop 31 is inserted between the output of the gate 24 and the current switch 28, 28' to effect the same shift in the modulated biasing signal 7E. Thus the signal 7E from the gate 24 is applied to the D input of flip-flop 31, the latter being controlled by the signal 7G coming from the output Q of the clock 30. The direct output Q of the flip-flop 31 excites the base of the transistor 28' through the amplifier 32, while the traverse output Q excites the transistor base 28 by means of the amplifier 33. In this way the signal circulating in the recording winding 26 is of the form shown at 7F', this signal being a version which is shifted by a predetermined time interval (here a quarter of a period) of the transitions of the data signal 7D. As this time period is constant, the signal 7F' corresponds to the signal 5F relative to the basic device shown in FIG. 4.

This system has the advantage of obtaining a precise phase relationship between the strong current control signal 7H and the current switch (28, 28') control signal 7E' due to the intervention of the clock signal 7G controlling the two flip-flops 29 and 31 which generated signal 7H and 7E'. The device 20 is, as a result, not affected by the wave propagation times in the various components which precede the flip-flops.

Figure 8:
FIG. 8 shows, in broken lines, part of the theoretical signal shown in FIG. 7F' and indicates, by a solid line, how this signal is made in practice.

Another advantage of the invention is shown in FIG. 8 which shows the theoretical signal 7F' as a fine line and the shape 7F" of the signal obtained in practice on the recording support as a solid line. It will be noted, in effect, that the half-wave peak amplitude which marks each transition is greater than that of the other half-wave. Taking into account the resistive and capacitive parasitic components of the recording winding, the latter introduces a time constant for establishment of the recording signal about the peak values ±a and ±b. The result is that the actual signal 7F" cannot normally reach these values in the space of a half period and breaks at peak values /a'/</a/ and /b'/</b/. Because of the levels h and l introduced into the modulated biasing signal according to the invention, the actual signal 7F" has a whole period available so that the peak amplitudes /b"/ of the half-waves marking the transitions are practically equal to /b/. This increases the reliability of reproduction of the recorded message.

Figure 9:
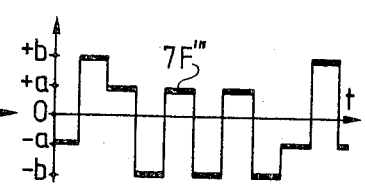
FIG. 9 illustrates a variation according to the invention of the signal shown in FIG. 7F'.

It will also be noted that the positive and negative transitions of the data signals 5D and 7D correspond respectively to the low levels l and high levels h in the recorded signals 7F and 7F'. FIG. 9 shows a recording signal 7F''' which would be obtained in place of the signal 7F' if the output Q of the flip-flop 29 (FIG. 6) fed the input 27b which controls the weak currents from the current source 27 and the connection 19 Q—27a was suppressed. In this case it is seen that the positive and negative transitions of the data signals 5D and 7D correspond respectively to the high and low levels of the recording signal 7F'''.

It will finally be noted that, in a general manner, in a circuit arrangement 20 such as illustrated in FIG. 6, the frequency of the biasing signal 7E should be a whole multiple (here 2) of the frequency of the signal 7G delivered by the clock 30.

Figure 10:
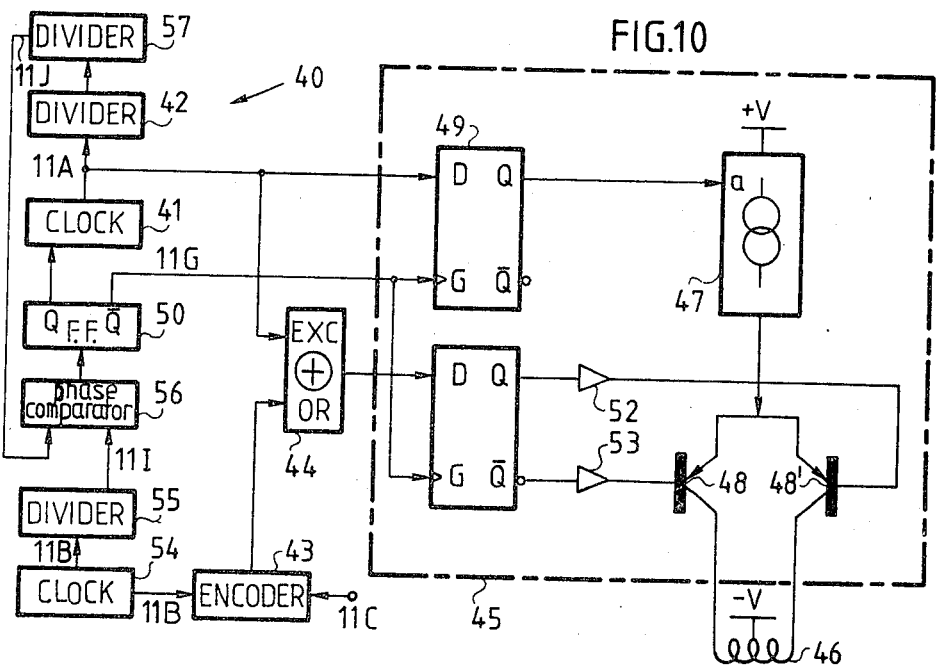
FIG. 10 shows a second embodiment according to the invention of a digital magnetic recording arrangement with alternating bias.

FIGS. 10 and 11 relate to a magnetic recording arrangement 40 which is a modification of the embodiment of the arrangement 20 which has just been described with reference to FIGS. 6 to 9. The similarity between the arrangements 20 and 40 is seen from analogy in numbering the components and signals, the components 41 to 53 of the arrangement 40 corresponding respectively to components 21 to 33 of the arrangement 20 and the signals 11A to 11H corresponding respectively to signals 7A to 7H. In fact, the difference in structure of the arrangements 20 and 40 resides in the formation of the clock signals for the gate 44 and the combination element 45. Whereas, in the arrangements 10 and 20, the clock signals 5B and 7B, which control the coding of the data signal which enters the respective coders 13 and 23, come from a clock 11 or 21 by frequency division, in arrangement 40 the signal 11B which serves for coding the original in information 11C in encoder 43 is directly produced by a base clock 54 from which is formed the clock signal 11A by successive modifications in frequency. Thus the signal 11B passes into a divide-by-two circuit 55 which delivers a signal 11I which is applied to a first input of a phase comparator 56. This comparator is the first element of a phase-locking system, which further comprises elements 50, 41, 42 and 57, and operates in such a way that its output signal corresponds to the signal 11I to control the astable flip-flop 50. The frequency of the signal 11G is thus in a predetermined relationship with signal 11I just as the signal produced at the output Q of the oscillator 50 which controls the clock 41. This clock is a divide-by-two circuit so as to furnish the clock signal 11A which is necessary for the elaboration of the biasing signal 11E which comes from the gate 44. The clock signal 11A is frequency-regulated by a return loop formed by a divider 42 which divides by N (N=6 in the example shown) followed by a divide-by-two circuit 57 producing a signal 11J applied to a second input of the phase comparator 56. In this way any variation in phase of the signal 11J is corrected by the comparator 56 to tend towards that of the signal 11I.

Although the examples shown are based on the NRZ1 coding, the preceding text brings out clearly that the invention can be applied to any sort of coding involving any set of transitions whatsoever (such as coded phase coding for example). In other words, the invention is in no way limited to the embodiments which have been described and illustrated but, on the contrary, comprises all technical equivalents of the means described in the claims which follow. On the other hand, although the clock signals represented are square pulse signals (with a cyclic ratio of 0.5), the invention is applicable equally to any rectangular pulse signal (of any cyclic ratio) or any alternating wave signal such as a sinusoidal signal, for example. In effect, only strong and weak current intensities are taken into account in the reading and reproduction of data since they determine the work zone on the magnetisation curve of the material indifferently to the switching times between strong and weak currents. Furthermore, due to the phase modulation of the biasing signal according to the invention, it has been seen that the combination of this coded data signal always occurs favorably.

What is claimed is:

1. A circuit arrangement for magnetic recording of a digital data signal composed of a set of transitions comprising magnetic biasing means for delivering a high frequency, constant amplitude, original biasing signal, said biasing means comprising a source of clock signals having a first version used for the formation of the said original biasing signal and a second version used for the formation of the said data signal, and means for combining the said digital data signal with the said magnetic biasing signal so as to provide a recording signal, said combining means comprising a current switch device connected to receive complementary formats of the data signal, a recording winding connected to said switch device to produce the recording signal, and a current source supplying the said current switch and controlled by strong or weak currents, and means for phase modulating the original biasing signal relative to the data signal transitions, said phase modulation means comprising an exclusive OR gate receiving the said original biasing signal and the said data signal.

2. A circuit arrangement for magnetic recording of a digital data signal composed of a set of transitions comprising magnetic biasing means for delivering a high frequency, constant amplitude, original biasing signal, said biasing means comprising a source of clock signals having a first version used for the formation of the said original biasing signal and a second version used for the formation of the said data signal, and means for combining the said digital data signal with the said magnetic biasing signal so as to provide a recording signal, said combining means comprising first and second D flip-flops, the first flip-flop receiving the said first version of the clock signal on its D input and a second clock signal whose frequency corresponds to a whole multiple of the frequency of the said first version of the first clock signal on its G input, and the second D flip-flop receiving the said original biasing signal on its D input and the said clock signal on its G input, the Q and Q outputs of the second D flip-flop producing complementary formats of the data signal, and means for phase modulating the original biasing signal relative to the data signal transitions.

3. A circuit arrangement for magnetic recording of a digital data signal composed of a set of transitions comprising magnetic biasing means for delivering a high frequency, constant amplitude, original biasing signal, means for combining the said digital data signal with the said magnetic biasing signal so as to provide a recording signal, said combining means comprising two current switch devices respectively furnishing signals which are representative of the phase modulated biasing signal and the said data signal and a recording winding connected to said switch devices to produce the recording signal, and means for phase modulating the original biasing signal relative to the data signal transitions, said phase modulation means comprising an exclusive OR gate receiving the said original biasing signal and the said data signal.

4. A circuit arrangement for magnetic recording of a digital data signal composed of a set of transitions comprising magnetic biasing means for delivering a high frequency, constant amplitude, original biasing signal, said biasing means comprising a source of clock signals having a first version used for the formation of the said original biasing signal and a second version used for the formation of the said data signal, and means for combining the said digital data signal with the said magnetic biasing signal so as to provide a recording signal, and means for phase modulating the original biasing signal relative to the data signal transitions, said phase modulation means comprising an exclusive OR gate receiving the said original biasing signal and the said data signal and the combining means comprising two current switch devices respectively furnishing signals which are representative of the phase modulated biasing signal and the said data signal and a recording winding connected to said switch devices to produce the recording signal.

* * * * *